(12) United States Patent
Smith

(10) Patent No.: US 9,300,357 B2
(45) Date of Patent: Mar. 29, 2016

(54) SIGNAL SPLITTER

(71) Applicant: Dale T Smith, San Jose, CA (US)

(72) Inventor: Dale T Smith, San Jose, CA (US)

(73) Assignee: SeralTek, LLC, San Jose, CA (US)

( * ) Notice: Subject to any disclaimer, the term of this patent is extended or adjusted under 35 U.S.C. 154(b) by 484 days.

(21) Appl. No.: 13/965,839

(22) Filed: Aug. 13, 2013

(65) Prior Publication Data

US 2014/0049336 A1 Feb. 20, 2014

Related U.S. Application Data

(60) Provisional application No. 61/691,105, filed on Aug. 20, 2012.

(51) Int. Cl.
*H04B 3/04* (2006.01)
*H04B 3/46* (2015.01)

(52) U.S. Cl.
CPC ... *H04B 3/04* (2013.01); *H04B 3/46* (2013.01)

(58) Field of Classification Search
CPC .......................................................... H04B 3/46
USPC .............................. 333/100; 370/355; 324/605
See application file for complete search history.

(56) References Cited

U.S. PATENT DOCUMENTS

| | | | | |
|---|---|---|---|---|
| 5,222,246 A | * | 6/1993 | Wolkstein | H03F 3/602 330/107 |
| 5,323,474 A | * | 6/1994 | Hornung | H04B 10/2912 372/6 |
| 6,580,549 B1 | * | 6/2003 | Kinoshita | H04B 10/294 359/337 |
| 6,637,033 B1 | * | 10/2003 | Cloonan | H04N 7/102 348/E7.052 |
| 2002/0145449 A1 | * | 10/2002 | Rivoir | H03M 9/00 326/93 |

* cited by examiner

*Primary Examiner* — Jeff Natalini
(74) *Attorney, Agent, or Firm* — Douglas L. Weller

(57) ABSTRACT

Signals sent between a first device and a second device are split. A first user adjustable input signal equalization and gain compensates for losses to signals from the first device before the compensated signals are forwarded to the second device, a first analytic instrument and a second analytic instrument. A second user adjustable input signal equalization and gain compensates for losses to signals from the second device before the first compensated signals are forwarded to the first device, the first analytic instrument and the second analytic instrument.

14 Claims, 3 Drawing Sheets

SIGNAL SPLITTER

BACKGROUND

Protocol Analyzers are used to capture, examine, and debug the complex protocols used by storage and networking busses. Oscilloscopes are used to view waveforms and verify signal integrity. Modern point-to-point busses, such as those operating in accordance with the Serial Attached SCSI (SAS) protocol, transfer data at a rate of gigabytes per second on each of multiple differential transmission lines, and employ complex protocols for equalizing or training the transmitters in order to compensate for the frequency dependent characteristics of the cable or transmission line.

Tapping into or splitting a transmission line degrades transmitted signals because splitting redirects a portion of the signal resulting in power loss, and tapping changes the impedance of the transmission line, creating signal reflections. As an alternative to tapping into a transmission line, protocol analyzers often use a technique of terminating the received signal and then retransmitting it again as a clean new point-to-point signal with full strength. Such a technique will usually change the signal waveform somewhat, so performing this technique multiple times on the same signal in order to attach multiple instruments is undesirable.

One aspect of modern GHz busses which adds to the difficulty of troubleshooting while maintaining high signal integrity is the large number of signals involved. For example, SAS hosts and expanders are typically four lanes wide, with each lane consisting of two differential pairs; one pair in each direction. Thus a typical SAS bus involves sixteen signals all operating at GHz speeds. The large number of signals makes it more difficult to tap or split without introducing stubs or discontinuities into the transmission line.

DETAILED DESCRIPTION

For a bus that operates point-to-point at gigahertz (GHz) speeds and employs transmitter training protocols, it is desirable to connect two analytic instruments, such as a protocol analyzer and an oscilloscope, in order to develop and debug the transmitter equalization protocol. For example, it is desirable to connect both a protocol analyzer and an oscilloscope to a GHz bus without changing the signal so that the equalization protocol sequence does not change significantly. Significant changes in the equalization protocol sequence makes it difficult to reproduce and debug a protocol problem with transmitter training.

In order to support simultaneous protocol analysis and waveform analysis using separate instruments, a device is needed which can create multiple true copies of the original signals, and with minimal change to the original signals. A desirable feature of the device is the ability to simplify the interconnections between the system under test and the protocol analyzer and oscilloscope so the user doesn't need to spend significant time organizing and labeling cables and connectors. For SAS, such a system under test necessarily involves sixteen signals to and from the Initiator, sixteen signals to and from a target, sixteen signals to the protocol analyzer, and sixteen signals to the oscilloscope. Thus, the ideal device is a four-lane, three-way differential splitter, with two bi-directional connections for the devices under test, and unidirectional connections to the protocol analyzer and oscilloscope.

Another desirable feature of a device used for splitting a GHz signal into multiple true copies, is a way to undo the frequency dependent losses incurred by the cabling and printed circuit board (PCB) traces required to implement and connect the device. By implementing adjustable input signal equalization (ISE) and gain in the device, a user can undo the frequency dependent losses and overall loss.

Figure 1:
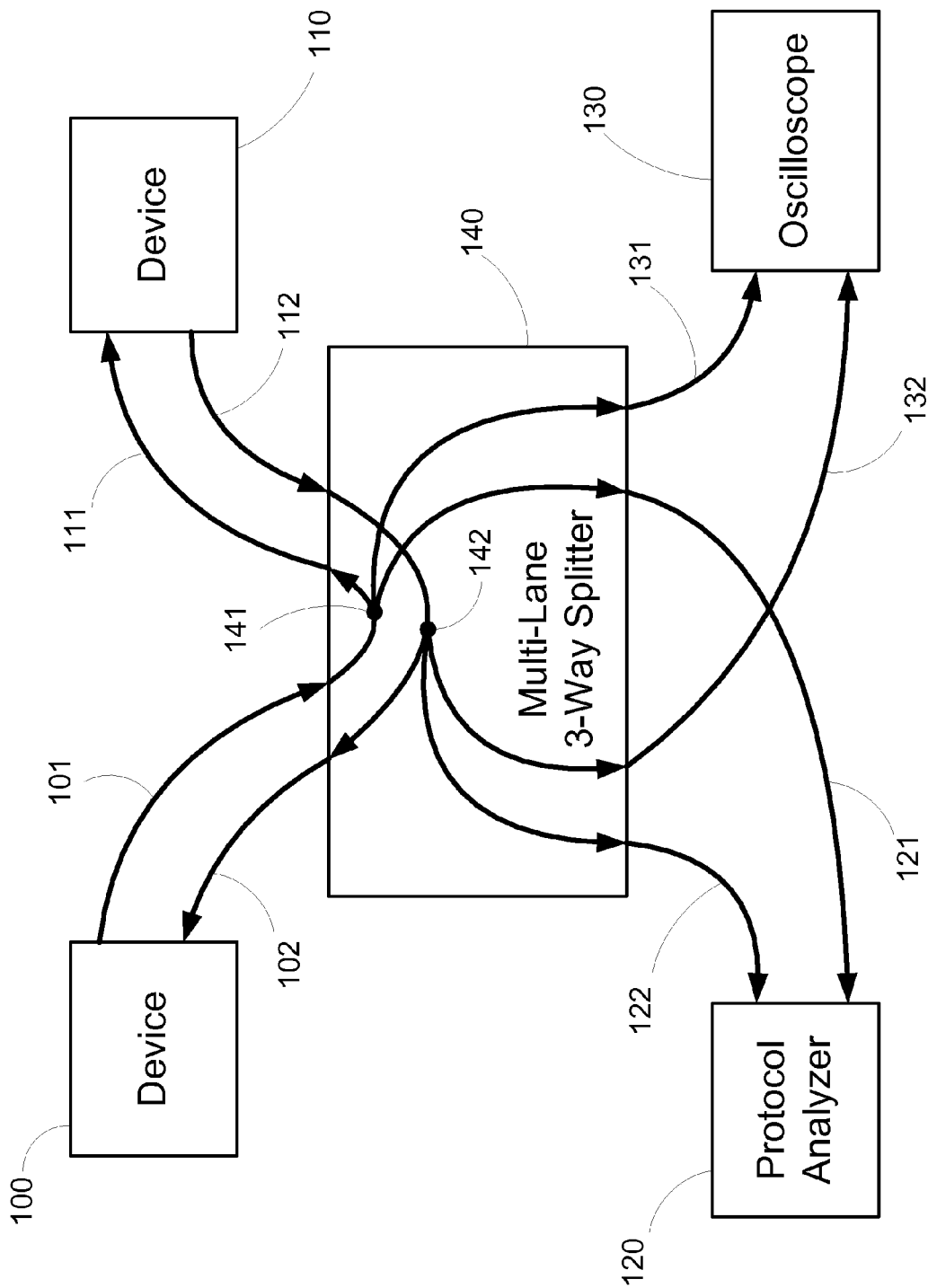
FIG. 1 is a simplified and idealized block diagram showing a Multi-Lane three-way splitter being used to make copies of original signals for two analytic instruments in accordance with an embodiment.

FIG. 1 shows a device 100 connected to a device 110 through a multi-lane three-way splitter 140. For example device 100 is an initiator and device 110 is a target connected to each other via a bus that operates in accordance with the SAS protocol. Alternatively, for example, device 100 is a host and device 110 is a card connected to each other via a bus that operates in accordance with the Peripheral Component Interconnect Express (PCIe) protocol. Alternatively, for example, device 100 and device 110 connected to each other in accordance with some other bus protocol.

Splitter 140 duplicates the original signals and provides the copies to a protocol analyzer 120 and an oscilloscope 130. A cable from device 100 is bidirectional, and includes transmit lines 101 and receive lines 102 each consisting of four sets or lanes of differential pair signaling. Likewise, a cable from device 110 is bidirectional, and includes a transmit direction 112 and a receive direction 111 each consisting of four sets or lanes of differential pair signaling. The implementation of a transmit signal splitter element 141 and a transmit signal splitter element 142 is shown in more detail in FIG. 2. Splitter 140 forwards copies of all device 100 and device 110 transmitted signals to protocol analyzer 120 using two separate cables: a cable 121 providing device 100 transmit signals, and a cable 122 providing device 110 transmit signals. Splitter 140 also forwards copies of all device 100 and device 110 transmitted signals to oscilloscope 130 using two separate cables: a cable 131 providing device 100 transmit signals, and a cable 132 providing device 110 transmit signals. While in FIG. 1 the copies of signals are forwarded to oscilloscope 130 and protocol analyzer 120, a person of ordinary skill in the art would recognize that these copies of signals could be sent to many other types of analytic instrument, such as a network analyzer, or any analytic instrument equipped to receive and analyze the copies of signals.

Figure 2:
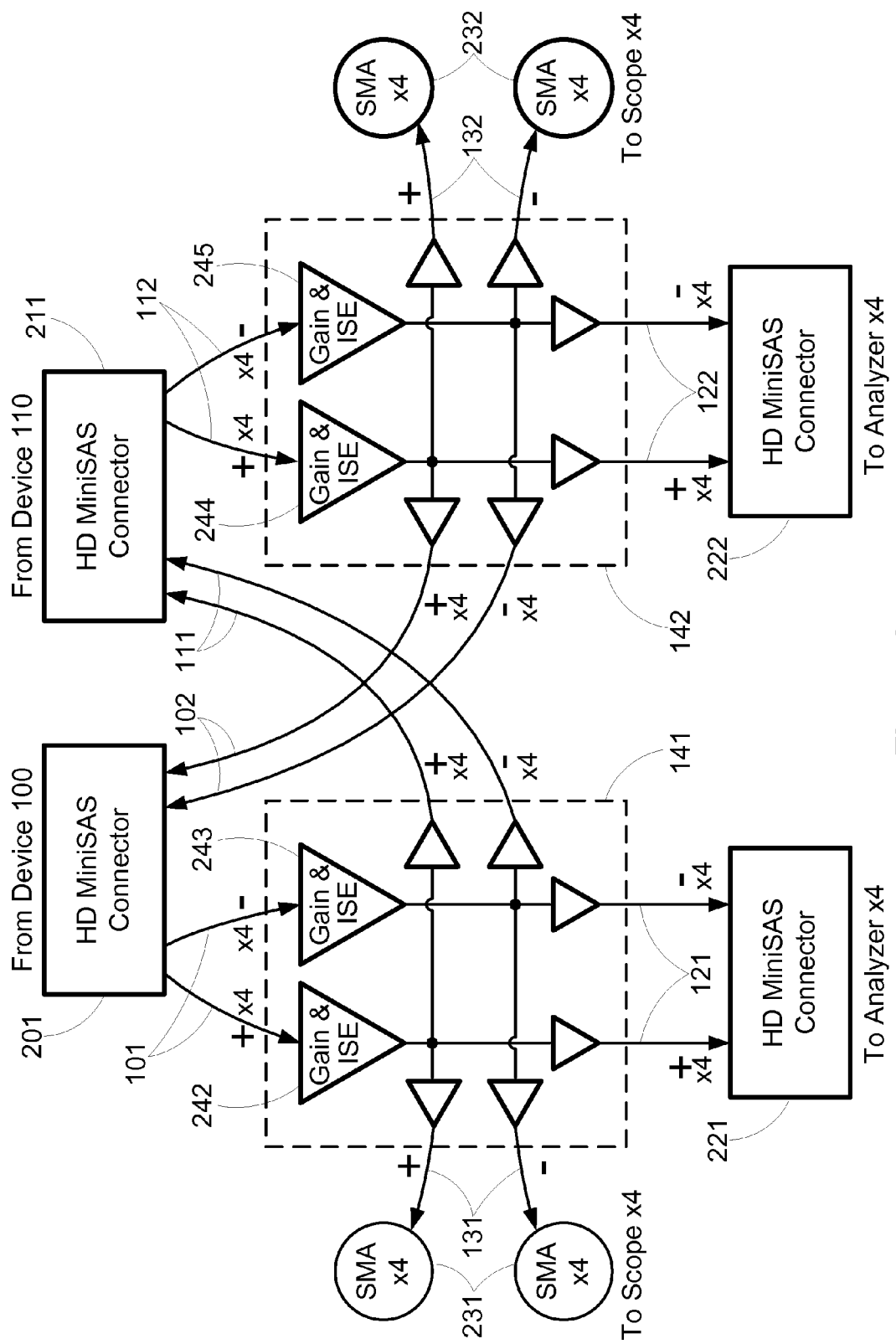
FIG. 2 is a block diagram of a four-lane, bi-directional, three-way differential splitter using typical SAS connectors and including gain and input signal equalization (ISE) adjustment functions in accordance with an embodiment.

FIG. 2 shows a more detailed block diagram of four-lane bi-directional three-way differential splitter 140, transmit signal splitter element 141 and transmit signal splitter element 142. To support four-lanes of bi-directional differential pairs, an HD miniSAS Connector 201 is used to transmit to, and receive data from device 100 through receive lines 102 and transmit lines 101. HD miniSAS connector 211 performs the same function for device 110. Once the four lanes of differential signals transmitted by device 100 have entered splitter 140, the positive (+) side of each differential pair goes into gain & ISE block 242, and the negative (−) side of each differential pair goes into gain & ISE block 243. ISE & gain blocks 244 and 245 provide the same function for device 110 transmit signals as 242 and 243 provide for device 100 transmit signals.

Figure 3:
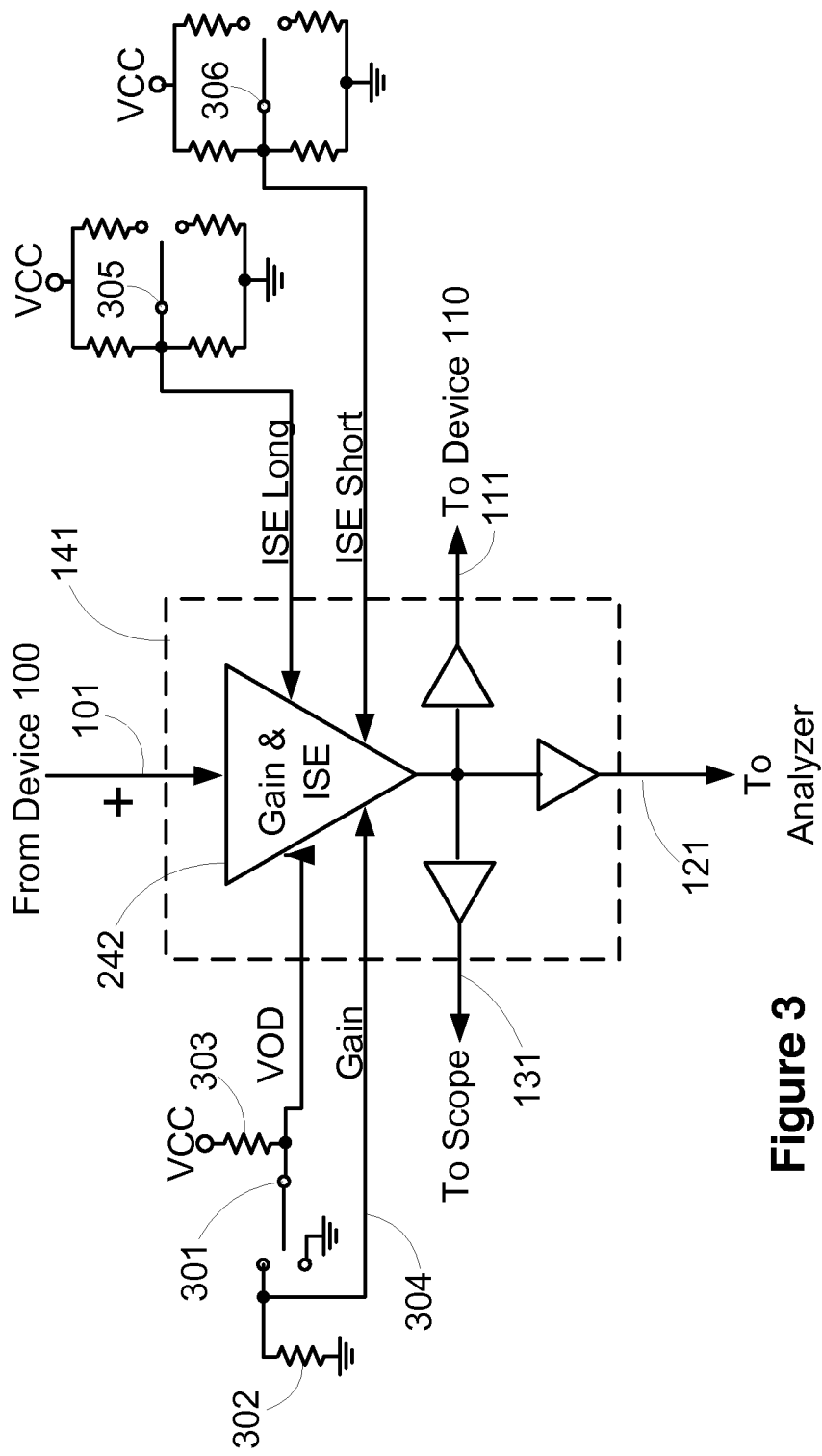
FIG. 3 is a block diagram that provides information about controls for user adjustable gain and ISE in accordance with an embodiment.

The gain and ISE blocks provide the user with a way to select gain settings of half, unity, or double, and they provide equalization settings which can perform frequency dependent boost in two different frequency ranges, including a long bit-time boost used to boost non-return-to-zero (NRZ) signals that do not change for many successive bit times, and a short bit-time boost used to boost the rise/fall transition speed. FIG. 3 provides more detail on the functions of the ISE & gain blocks.

Each of the gain & ISE blocks 242, 243, 244, and 245 drives 3 output drivers. One driver forwards the signal on to the original destination of device 100 or device 110 through HD miniSAS connector 201 or 211, another driver forwards the signal to the protocol analyzer 120 through HD miniSAS connector 221 or 222, and the third driver forwards the signal to the oscilloscope 130 through SubMiniature version A (SMA) connectors 231 or 232.

Because the four-lane Bi-Directional three-way Differential Splitter never interprets a differential pair as asserted or de-asserted, but treats each signal as a separate linear signal, it is able to correctly forward the common-mode, or out-of-band signaling used by modern GHz busses, such as PCIe, SAS, SATA, and USB 3.0 busses. These busses use the same transmission lines at low speed to communicate low-frequency information, such as RESET or WAKE-UP, by driving both the positive and negative side of a differential pair to the same voltage level, thus creating a common-mode voltage. To support common-mode signaling protocols, splitter 140 must not compare the positive and negative inputs and generate its output based on whether the positive or negative is higher, as a traditional differential receiver does.

Splitters 141 and 142 are each implemented with a Quad 1:2, 2:1 multiplexor (Mux), such as a TI SN65LVCP114 multiplexor available from Texas Instruments. A third output from the TI SN65LVCP114 multiplexor is realized by configuring a C input for loopback diagnostics mode, and by enabling loopback on the C port. The C port then becomes the third output copy of the input signal.

FIG. 3 provides additional details about the gain & ISE controls. Gain & ISE block 242 has two input control signals labeled VOD and gain in FIG. 3. The VOD control signal, when high, doubles the differential output voltages. The gain control signal, when high, selects unity gain, and when low selects half gain. Between the VOD and gain control signals, total gain selections of half, unity, and double can be made. A three-position switch 301 controls the VOD and gain control signals such that when switch 301 is in the down position, VOD and gain control signals are both low selecting half gain. When switch 301 is in the middle or no-contact position, the gain control signal is low and the VOD control signal is high, thus selecting unity gain. When switch 301 is in the up position, resistor 303 with a much lower resistance overrides resistor 302 with a much higher resistance causing both the VOD and the gain control signals to be high, thus selecting a gain of double.

Gain & ISE block 242 has two tri-state inputs which select the equalizer (EQ) settings. Three-position switch 305 selects between the three ISE Long settings, and three-position switch 306 selects between the three ISE Short settings.

Gain & ISE blocks 243, 244, and 245 in FIG. 2 function the same as gain & ISE block 242 as described in additional detail above and as shown in additional detail in FIG. 3.

At first it may seem counter-productive to add ISE to the signals considering that the purpose of the three-way splitter is to ensure that the original signals are as unchanged as possible, but adding ISE counteracts the frequency dependent changes caused to the signals by the addition of the cables and PCB traces associated with splitter 140. By adding ISE, the signal waveforms are brought back to their original wave shape, as if the cables and splitter were not in the path.

The foregoing discussion discloses and describes merely exemplary methods and implementations. As will be understood by those familiar with the art, the disclosed subject matter may be embodied in other specific forms without departing from the spirit or characteristics thereof. Accordingly, the present disclosure is intended to be illustrative, but not limiting, of the scope of the invention, which is set forth in the following claims.

I claim:

1. A splitter, comprising:
   a first input for receiving signals from a first device;
   a second input for receiving signals from a second device;
   a first transmit signal splitter element that receives the first input, the first transmit signal splitter including a first user adjustable input signal equalization and gain that when adjusted compensates for losses to the signals from the first device to produce first compensated signals;
   a second transmit signal splitter element that receives the second input, the first transmit signal splitter including a second user adjustable input signal equalization and gain that when adjusted compensates for losses to the signals from the second device to produce second compensated signals;
   a first output for forwarding the first compensated signals to the second device;
   a second output for forwarding the first compensated signals to a first analytic instrument;
   a third output for forwarding the first compensated signals to a second analytic instrument;
   a fourth output for forwarding the second compensated signals to the first device;
   a fifth output for forwarding the second compensated signals to the first analytic instrument; and,
   a sixth output for forwarding the second compensated signals to the second analytic instrument.

2. A splitter as in claim 1 wherein the first user adjustable input signal equalization and gain allows a user to select gain settings of half, unity or double, and allows a user to select frequency dependent boost in two frequency ranges.

3. A splitter as in claim 1 wherein the first input receives sixteen signals in parallel from the first device and the second input receives sixteen signals in parallel from the second device.

4. A splitter as in claim 1 wherein the first transmit signal splitter element additionally includes:
   a first driver that forwards the first compensated signals to the first output;
   a second driver that forwards the first compensated signals to the second output; and,
   a third driver that forwards the first compensated signals to the third output.

5. A splitter as in claim 4 wherein the second transmit signal splitter element additionally includes:
   a first driver that forwards the second compensated signals to the fourth output;
   a second driver that forwards the second compensated signals to the fifth output; and,
   a third driver that forwards the second compensated signals to the sixth output.

6. A splitter as in claim 1 wherein the first user adjustable input signal equalization and gain allows a user to select frequency dependent boost in two frequency ranges, including a long bit-time boost used to boost non-return-to-zero (NRZ) signals that do not change for many successive bit times, and a short bit-time boost used to boost rise/fall transition speed.

7. A splitter as in claim 1 wherein the first analytic instrument is an oscilloscope and the second analytic instrument is a protocol analyzer.

8. A method for splitting signals sent between a first device and a second device, comprising:

receiving first signals from the first device;

using a first user adjustable input signal equalization and gain to compensate for losses to the first signals in order to produce first compensated signals;

forwarding the first compensated signals to the second device, a first analytic instrument and a second analytic instrument;

receiving second signals from the second device;

using a second user adjustable input signal equalization and gain to compensate for losses to the second signals in order to produce second compensated signals;

forwarding the second compensated signals to the first device, the first analytic instrument and the second analytic instrument.

9. A method as in claim 8 additionally comprising:

allowing a user to select gain settings of half, unity or double; and allowing a user to select frequency dependent boost in two frequency ranges.

10. A method as in claim 8:

wherein receiving first signals from the first device includes receiving sixteen signals in parallel from the first device; and, wherein receiving second signals from the second device includes receiving sixteen signals in parallel from the second device.

11. A method as in claim 8 additionally comprising:

using a first driver to forward the first compensated signals to the second device;

using a second driver to forward the first compensated signals to the first analytic instrument; and, using a third driver to forward the first compensated signals to the second analytic instrument.

12. A method as in claim 11 additionally comprising:

using a fourth driver to forward the second compensated signals to the first device;

using a fifth driver to forward the second compensated signals to the first analytic instrument; and, using a sixth driver to forward the second compensated signals to the second analytic instrument.

13. A method as in claim 8 additionally comprising:

allowing a user to select frequency dependent boost in two frequency ranges, including a long bit-time boost used to boost non-return-to-zero (NRZ) signals that do not change for many successive bit times, and a short bit-time boost used to boost rise/fall transition speed.

14. A method as in claim 8 wherein the first analytic instrument is an oscilloscope and the second analytic instrument is a protocol analyzer.

\* \* \* \* \*